March 20, 1951     C. W. FRESE ET AL     2,545,951
DISCHARGING FIRE-EXTINGUISHING MEDIA
Filed April 24, 1946     2 Sheets-Sheet 1
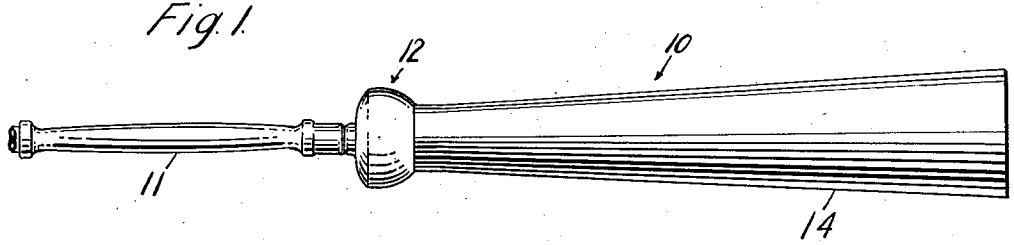
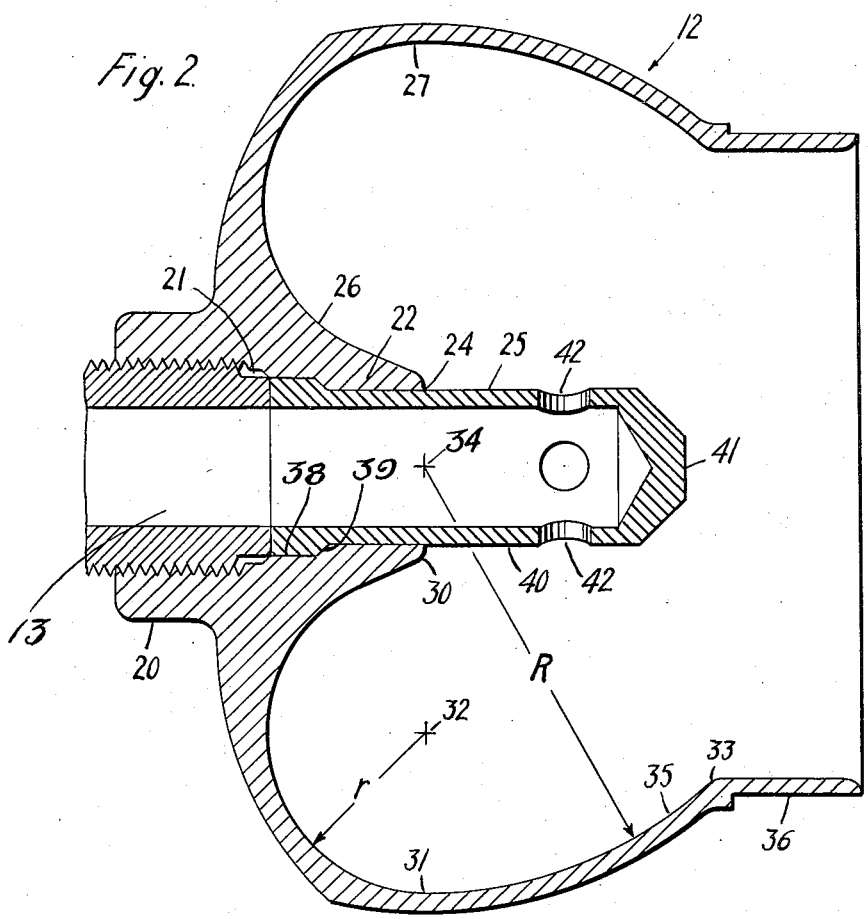
INVENTORS
THOMAS P. SCOTT
CARL W. FRESE
BY
Ernest A. Joerren
ATTORNEY March 20, 1951 C. W. FRESE ET AL 2,545,951
DISCHARGING FIRE-EXTINGUISHING MEDIA
Filed April 24, 1946 2 Sheets-Sheet 2
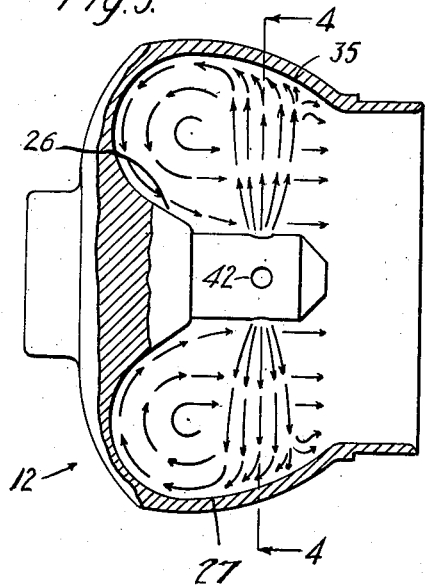
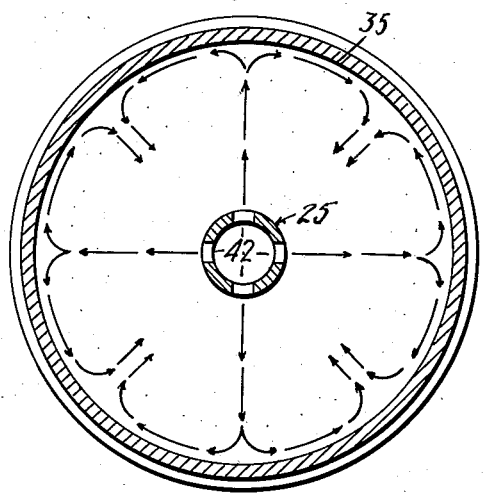
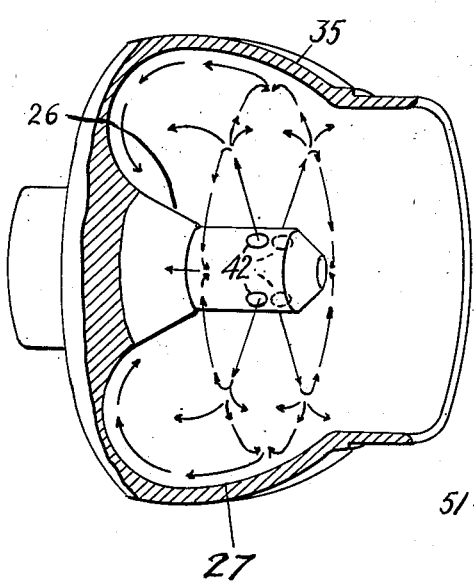
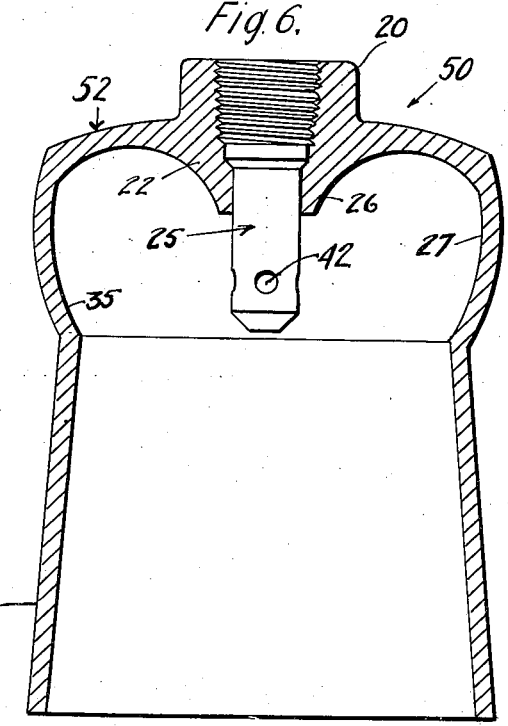
INVENTORS
THOMAS P. SCOTT
CARL W. FRESE
BY
Ernest A. Joenen
ATTORNEY Patented Mar. 20, 1951

2,545,951

UNITED STATES PATENT OFFICE 2,545,951

DISCHARGING FIRE-EXTINGUISHING MEDIA

Carl W. Frese, New York, N. Y., and Thomas P. Scott, Caldwell, N. J., assignors to Specialties Development Corporation, Belleville, N. J., a corporation of New Jersey Application April 24, 1946, Serial No. 664,576

10 Claims. (Cl. 169—11)

This invention relates to discharging fire extinguishing media under pressure, such as carbon dioxide or the like, and particularly to improved apparatus for discharging carbon dioxide in the form of a stream comprising carbon dioxide snow and gas.

Carbon dioxide has been used extensively as a fire extinguishing agent by storing the same in a container under pressure and discharging it to the seat of the fire to be extinguished in the form of a stream comprising carbon dioxide snow and gas. In certain applications it is very desirable that the stream comprises a relatively high percentage of snow while in other applications the stream may comprise mostly gas. It is also desirable to avoid the entrainment of air in order to maintain the maximum fire extinguishing effectiveness of the carbon dioxide.

During recent years, carbon dioxide fire extinguishing apparatus has been used in many applications where the temperature conditions at which the carbon dioxide is stored vary widely or fluctuate rapidly. For example, it is quite usual that this temperature range is between —50° F. and 150° F.

Various discharge devices have been used to produce snow or attain other desirable discharge characteristics, but all of these devices which were commercially feasible did not operate with equal effectiveness throughout the entire temperature range. Some of such devices failed to produce snow in desired quantities and failed to prevent entrainment of air when carbon dioxide at higher temperatures in the range was discharged therethrough, while other devices were ineffective to discharge and direct the carbon dioxide on the fire at low temperatures in the range.

Accordingly, an object of the present invention is to provide carbon dioxide discharge apparatus which is highly effective at temperatures to which the stored carbon dioxide may be subjected.

Another object is to provide apparatus for discharging carbon dioxide at a high rate of discharge and at a low forward velocity as compared with existing devices of like size.

Another object is to provide apparatus wherein the velocity of the carbon dioxide stream is greatly reduced substantially immediately from its inception in a manner to avoid the entrainment of air.

Another object is to produce a stream of carbon dioxide containing a high percentage of snow at given conditions of discharge and having a uniform density throughout over a wide area.

Another object is to reduce recoil and lateral reaction to a minimum.

Another object is to minimize the generation of static electricity.

Another object is to provide apparatus which is adapted to produce quantities of snow at least equal to quantities produced by existing devices of the same capacity under like conditions of discharge.

Another object is to provide apparatus wherein carbon dioxide is subjected to great turbulence and mixing within a relatively small space.

Another object is to provide apparatus wherein maximum expansion of the carbon dioxide with minimum inflow of heat is effected before mixing, resulting in the formation of large amounts of snow in a stream of greatly reduced velocity.

Another object is to provide apparatus which is readily modified for applications under certain temperature conditions where the formation of large amounts of snow is not essential while retaining the low velocity characteristics.

A further object is to provide apparatus which is relatively simple in construction, is readily manufactured and assembled, and is easily handled and stored.

Other and further objects, not specifically enumerated above, will be apparent when described in greater detail in connection with the accompanying drawings wherein:

Figure 1 is a side elevational view illustrating a flared horn type discharge device embodying the present invention.

Figure 2 is a longitudinal sectional view of a portion of the device shown in Figure 1.

Figure 3 is a flow diagram illustrating the direction of flow of carbon dioxide or like medium through the device shown in Figure 2.

Figure 4 is a flow diagram of the medium when viewed substantially along the line 4—4 on Figure 3.

Figure 5 is a flow diagram, in perspective, combining the flow diagrams shown in Figures 3 and 4.

Figure 6 is a sectional view of a shielded nozzle type discharge device embodying the present invention.

Referring to Figures 1 and 2 of the drawings, there is shown a carbon dioxide discharge device 10 of the portable flared horn type for extinguishing fires. The device comprises a handle portion 11 having a conduit 13 (Figure 2) extending therethrough and adapted to be connected by a flexible hose (not shown) to a source of carbon dioxide under pressure in the usual manner, a bowl-shaped receptacle 12 connected to the handle portion 11 and in flow communication with the conduit, and a horn or shield 14 secured to the forward end of the receptacle 12.

As shown in Figure 2, the receptacle 12 is in the form of a circular bowl-shaped shell having a central spud or bushing portion 20 extending outwardly from the rear wall of the shell and provided with a threaded bore 21 for securing the conduit 13 of the handle portion 11 to the receptacle. The shell has an inwardly projecting central portion 22 provided with a bore 24 which is a continuation of the bore 21 and is adapted for mounting a nozzle 25, described in detail hereinafter. The portion 22, at its outer periphery, is formed to provide an annular arcuate inner end wall 26 contiguous with an annular side wall 27 of the shell adapted to provide an outer wall at the interior of the shell.

The inner and outer walls between points 30 and 31 have a substantially semi-circular contour, when viewed in section, developed by a radius $r$ extending from point 32. The outer wall between points 31 and 33 has an arcuate contour curving forwardly and inwardly, when viewed in section, which is developed by a larger radius $R$ extending from point 34 on the longitudinal axis of the bowl. At the forward end of the outer wall, designated by the point 33, the wall provides an inwardly extending or constricting lip portion 35, the function of which will be explained hereinafter. The inner and outer arcuate walls as constituted cooperate to provide an annular substantially U-shaped channel or chamber portion at the interior of the receptacle.

Extending forwardly of the lip portion 35, there is a cylindrical collar portion 36 for securing the horn 14 to the receptacle.

The receptacle may be constructed of material having a low heat conducting value to minimize the inflow of heat, or may be constructed of heat conducting material, such as metal, which may be suitably insulated to minimize the inflow of heat, whereby the snow forming characteristics of the receptacle are enhanced. The surfaces of the inner and outer walls at the interior of the receptacle preferably are smooth and free from parting lines, blow holes or peaks to reduce surface friction to a minimum.

The nozzle 25 comprises a tubular member 40, one end of which extends through the bore 24 and into the shell along the longitudinal axis thereof at least to a point approximately laterally opposite the point 33 of the outer wall. The other end of the tubular member has a flange 38 which is seated on a shoulder 39 between the bores 21 and 24 and is engaged by the end of the conduit 13 threadedly secured in the bore 21, as shown in Figure 2.

The tubular member has an imperforate end wall 41 and has a plurality of equidistantly circumferentially spaced radially outwardly extending apertures or orifices 42 adjacent the end wall 41 for directing jets of carbon dioxide towards the lip portion 35 of the outer wall rearwardly of the point 33. Four such orifices are shown for purposes of illustration, but it will be appreciated that any desired number may be employed and that the orifices may be spaced rearwardly at different distances from the end wall 41 to direct jets toward the outer wall 27 of the shell in different planes.

It will also be appreciated that instead of being circular, the bowl may have an oval or any other generally annular shape, the orifices in such case being arranged to uniformly fill the bowl.

In Figures 3, 4 and 5, the flow of the carbon dioxide or like media through the horn is illustrated diagrammatically, the lines headed by arrows representing the directions of the flow.

The carbon dioxide is conducted from its source by the hose (not shown) to the conduit in the handle portion and thence to the nozzle 25. The carbon dioxide passes through the orifices 42 and expands rapidly to form diverging jets, the axis of each jet being directed substantially radially outwardly towards the lip 35 of the outer wall (Figures 3 and 5). Upon expanding, the jets produce streams comprising a mixture of carbon dioxide snow and gas. These streams are deflected by the outer wall 27 in opposite circumferential directions (Figure 4), whereby portions of each stream impinge upon portions of an adjacent stream to produce a mixing action. Major portions or at least substantial portions of the streams produced by the diverging jets are directed rearwardly due to the curvature of the outer wall 27 to effect further turbulent mixing, and the direction of flow of the streams is reversed by the inner wall 26 to a forward direction with respect to the receptacle. The forwardly flowing streams then intersect the radially outwardly directed streams to effect further mixing thereof and enter the rear or constricted end of the horn 14 to form a single forwardly moving stream of snow and gas. In passing through the horn, the stream continues to expand slightly, but by reason of the violent mixing action in the receptacle, its forward velocity has been materially reduced.

The horn 14 serves to shield the outlet end of the receptacle against inflow of heat by atmospheric air and also serves to eliminate the entrainment of air in the higher velocity zone of the stream. The horn may be circular or oval in cross-section and may flare or diverge outwardly or may converge slightly. The horn preferably is at least twice the length of the depth of receptacle to prevent such heat inflow and entrainment of air, and may be formed of material having a low thermal conductivity and high dielectric strength.

The combined receptacle and horn are adapted to produce a low velocity stream of carbon dioxide from carbon dioxide stored at temperatures between —50° F. and 150° F. and the corresponding pressure, which stream is rich in snow, has a uniform density throughout a wide area when discharged from the horn, and is without air cones or pockets. Due to the denseness and uniformness of the stream, the stream is thrown or projected greater distances than possible heretofore for like discharges, whereby the stream is highly effective to penetrate flames and extinguish fires, particularly fires of highly inflammable liquids such as gasoline, solvents and the like.

It has also been found that the device of the invention generates a minimum of static electricity compared with existing devices of like discharge capacity. Velocity and recoil are materially reduced, and lateral reaction is practically eliminated.

In Figure 6, a discharge device 50 of the shielded nozzle type is illustrated, which is particularly adapted for fire extinguishing systems for flooding an enclosed space or covering a hazard such as a tank or other apparatus containing gasoline, solvents or the like. The device 50 differs essentially from the device 10 shown in Figure 1 in that a relatively short horn or shield 51 is substituted, the bowl-like receptacle 52 being of similar design as in the device 10.

For installations of the foregoing character, the horn may be omitted entirely if desired. The bowl-like receptacle is adapted to discharge a large volume of carbon dioxide at a relatively low forward velocity with a minimum entrainment of air.

From the foregoing description it will be seen that the present invention provides a carbon dioxide discharge device which is simple in construction, is highly efficient in operation, is adapted to be used for many types of fire extinguishing applications, and is a distinct improvement in the art to which it relates.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

It is also to be understood that the following claims are intended to cover all the generic and specific features of the invention herein described, and all statements of the scope of the invention which, as a matter of language, might be said to fall therebetween.

We claim:

1. A discharge device comprising a substantially bowl-shaped receptacle having inner and outer annular arcuate walls at the interior thereof, and a conduit extending into said receptacle having a plurality of circumferentially spaced apertures therein each adapted to direct a stream of medium under pressure radially outwardly against the outer wall of said receptacle, said outer wall having a contour adapted to first deflect the streams in opposite circumferential directions whereby portions of each stream impinge upon portions of adjacent streams and then to deflect the streams rearwardly with respect to said receptacle, said inner wall having a contour to thereafter direct the streams forwardly of said receptacle.

2. A discharge device comprising a substantially bowl-shaped receptacle having inner and outer arcuate annular walls at the interior thereof forming a substantially U-shaped channel portion therein, and a conduit extending centrally into said receptacle having a plurality of radially outwardly facing orifices therein each adapted to direct a stream of pressure medium towards the outer wall of said channel portion, said outer wall having an inwardly extending lip to deflect the streams in a direction rearwardly of said receptacle, said channel portion having a contour to thereafter direct the streams forwardly of said receptacle.

3. A discharge device comprising a substantially bowl-shaped receptacle having inner and outer arcuate annular walls at the interior thereof forming a substantially U-shaped channel portion therein, a conduit extending centrally into said receptacle having a plurality of radially outwardly facing orifices therein each adapted to direct a stream of medium under pressure towards the outer wall of said channel portion, said outer wall having an inwardly extending lip to deflect the streams in a direction rearwardly of said receptacle, said channel portion having a contour to thereafter direct the streams forwardly of said receptacle and a flared horn extending outwardly from the lip of said receptacle.

4. A discharge device comprising a bowl-shaped receptacle having an annular arcuate side wall and an end wall, and a conduit in said receptacle having means for directing a stream of pressure medium radially outwardly against the side wall of said receptacle, said side wall having a contour to deflect a substantial portion of the stream in a direction rearwardly of said receptacle and said end wall having a contour to direct the deflected portion of the stream in a direction forwardly of said receptacle.

5. A discharge device comprising a bowl-shaped receptacle having an annular arcuate side wall and an end wall, and a conduit in said receptacle having an orifice therein adapted to form and direct a diverging stream of pressure medium radially outwardly against the side wall of said receptacle, said side wall having a contour to disperse the stream and deflect a substantial portion thereof in a direction rearwardly of said receptacle, and said end wall having a contour to direct the deflected portion of the stream in a direction forwardly of said receptacle to cause the radially and forwardly directed portions of the stream to intersect.

6. A discharge device comprising a bowl-shaped receptacle having an annular arcuate side wall and an end wall, and a conduit extending into said receptacle having a plurality of orifices therein adapted to direct streams of pressure medium radially outwardly against the side wall of said receptacle, said side wall having a contour to first deflect a substantial portion of the streams in a direction opposite to the direction the conduit extends into said receptacle and said end wall having a contour to direct the deflected portions of the streams in the direction the conduit extends into said receptacle.

7. A discharge device comprising a bowl-shaped receptacle having an annular arcuate side wall, an end wall and an opening opposite said end wall, a conduit in said receptacle having means for directing medium under pressure radially outwardly against the side wall of said receptacle, said side wall having a contour to deflect a substantial portion of the medium in a direction rearwardly of said opening and said end wall having a contour to direct the deflected medium in a direction towards said opening, and a discharge directing shield mounted on said receptacle at said opening.

8. A discharge device comprising a bowl-shaped receptacle portion having an annular arcuate side wall, an end wall and an opening opposite said end wall, a conduit in said receptacle having means for directing medium under pressure radially outwardly against the side wall of said receptacle portion, said side wall having a contour to deflect a substantial portion of the medium in a direction rearwardly of said opening and said end wall having a contour to direct the deflected medium in a direction towards said opening, and a discharge directing shield formed integral with said receptacle portion and extending forwardly of said opening.

9. A discharge device comprising a bowl-shaped receptacle having an annular arcuate end wall and an annular side wall extending from said end wall and defining an opening opposite said end wall, and a conduit extending into said receptacle from said end wall and centrally positioned with respect to said side wall, said conduit having orifice means facing said side wall adjacent said opening for directing a stream of pressure medium radially outwardly against said side wall, said side wall being constricted inwardly in a direction from said end wall to said opening and having a contour to deflect a substantial portion of the stream towards said end wall and said end wall having a contour to direct the deflected portion of the stream towards and through said opening.

10. A discharge device according to claim 9, wherein an outwardly flared tubular discharge directing shield extends outwardly from said opening.

CARL W. FRESE.
THOMAS P. SCOTT.

REFERENCES CITED

The following references are of record in the file of this patent:

UNITED STATES PATENTS

| Number | Name | Date |
| --- | --- | --- |
| 1,853,629 | Mapes | Apr. 12, 1932 |
| 1,993,696 | Allen et al. | Mar. 5, 1935 |
| 2,151,076 | Betzler | Mar. 21, 1939 |
| 2,218,189 | Allen | Oct. 15, 1940 |
| 2,357,039 | Williamson | Aug. 29, 1944 |

FOREIGN PATENTS

| Number | Country | Date |
| --- | --- | --- |
| 773,849 | France | Nov. 26, 1934 |
| 360,757 | Great Britain | Nov. 12, 1931 |